(12) United States Patent
Koo et al.

(10) Patent No.: US 11,327,885 B2
(45) Date of Patent: May 10, 2022

(54) CONTROLLER MANAGING NAMESPACE AND MEMORY SYSTEM HAVING THE CONTROLLER

(71) Applicant: SK hynix Inc., Icheon-si (KR)

(72) Inventors: Duck Hoi Koo, Suwon-si (KR); Gun Woo Yeon, Icheon-si (KR); Young Ho Kim, Seongnam-si (KR); Seung Geol Baek, Seongnam-si (KR); Suk Ho Jung, Seongnam-si (KR)

(73) Assignee: SKhynix Inc., Icheon-si (KR)

( * ) Notice: Subject to any disclaimer, the term of this patent is extended or adjusted under 35 U.S.C. 154(b) by 87 days.

(21) Appl. No.: 16/879,293

(22) Filed: May 20, 2020

(65) Prior Publication Data

US 2021/0165736 A1 Jun. 3, 2021

(30) Foreign Application Priority Data

Nov. 28, 2019 (KR) .................. 10-2019-0155958

(51) Int. Cl.
*G06F 12/00* (2006.01)
*G06F 12/02* (2006.01)
(Continued)

(52) U.S. Cl.
CPC .......... *G06F 12/0246* (2013.01); *G06F 9/544* (2013.01); *G06F 12/0871* (2013.01);
(Continued)

(58) Field of Classification Search
CPC .. G06F 12/0246; G06F 12/0871; G06F 9/544; G06F 12/0873; G06F 2212/7204;
(Continued)

(56) References Cited

U.S. PATENT DOCUMENTS

| 11,119,938 B2* | 9/2021 | Byun ...................... G06F 12/10 |
| 2018/0232144 A1* | 8/2018 | Pahwa .................. G06F 3/0679 |

(Continued)

FOREIGN PATENT DOCUMENTS

| KR | 10-2018-0047402 A | 5/2018 |
| KR | 10-2018-0131475 A | 12/2018 |

*Primary Examiner* — Mardochee Chery
(74) *Attorney, Agent, or Firm* — Perkins Coie LLP

(57) ABSTRACT

There are provided a controller and a memory system having the controller. The controller includes: a first storage area configured to store mapping information between logical addresses of logical regions of a storage device coupled to the controller and physical addresses of memory blocks of the storage device, the logical regions being divided into logical units including a first logical unit; and a second storage area configured to store allocation information on logical addresses of logical regions allocated to the first logical unit, each of the logical regions allocated to the first logical unit having a corresponding index, wherein the second storage area is further configured to store a location table for the first logical unit that includes index information having a smallest index corresponding to a logical region allocated to the first logical unit without having other indices corresponding to remaining logical regions allocated to the first logical unit and number information on a total number of the logical regions allocated to the first logical unit.

19 Claims, 12 Drawing Sheets

(51) Int. Cl.
  *G06F 12/0871* (2016.01)
  *G06F 9/54* (2006.01)
  *G06F 12/0873* (2016.01)

(52) U.S. Cl.
  CPC .. *G06F 12/0873* (2013.01); *G06F 2212/7201* (2013.01); *G06F 2212/7204* (2013.01)

(58) Field of Classification Search
  CPC ..... G06F 2212/7201; G06F 2212/1016; G06F 2212/7203; G06F 2212/7208; G06F 3/0631; G06F 3/064; G06F 3/0644; G06F 3/0658; G06F 12/0292; G06F 3/0611; G06F 2212/1024
  USPC ......................................................... 711/154
  See application file for complete search history.

(56) References Cited

U.S. PATENT DOCUMENTS

| | | | |
|---|---|---|---|
| 2018/0357159 A1* | 12/2018 | Parker | G06F 3/0688 |
| 2019/0146907 A1* | 5/2019 | Frolikov | G06F 3/0679 |
| | | | 711/103 |
| 2020/0019327 A1* | 1/2020 | Choi | G06F 12/0246 |

* cited by examiner

FIG. 2B

| | | | | | | | | | 1100 |
|---|---|---|---|---|---|---|---|---|---|
| 1R | 2R | 3R | 4R | 5R | 6R | 7R | 8R | 9R | 10R |
| 11R | 12R | 13R | 14R | 15R | 16R | 17R | 18R | 19R | 20R |
| 21R | 22R | 23R | 24R | 25R | 26R | 27R | 28R | 29R | 30R |
| 31R | 32R | 33R | 34R | 35R | 36R | 37R | 38R | 39R | 40R |
| 41R | 42R | 43R | 44R | 45R | 46R | 47R | 48R | 49R | 50R |
| ... | ... | ... | ... | ... | ... | ... | ... | ... | ... |

FIG. 2C

| 1100 |
|---|
| NS1 |
| NS2 |
| NS3 |
| NS4 |

[LR_T1]

| 1R | M11, M12 |
|----|----------|
| 2R | M13, M14 |
| 3R | M15, M16 |

⋮

[LR_T2]

| 1R | M11/MB1, MB2, MB3 |
|----|-------------------|
| 2R | M11/MB4, MB5, MB6 |
| 3R | M12/MB1, MB2, MB3 |

⋮

CONTROLLER MANAGING NAMESPACE AND MEMORY SYSTEM HAVING THE CONTROLLER

CROSS-REFERENCE TO RELATED APPLICATION

This patent document claims priority to the Korean patent application number 10-2019-0155958 filed on Nov. 28, 2019, which is incorporated herein by reference in its entirety for all purposes.

TECHNICAL FIELD

The present disclosure generally relates to a controller and a memory system having the controller. In some implementations, a controller is configured to manage an allocation table of a memory system.

BACKGROUND

A memory system may include a storage device configured to store data and a controller configured to communicate between a host and the storage device.

A memory device may include a volatile or nonvolatile memory device. The volatile memory device is a device that can retain its data only when power is supplied. Thus, a volatile memory device loses its data in the absence of power. A nonvolatile memory device is a device that can retain its data even in the absence of power. Recently, as portable electronic devices have been used in various fields, the demand for the nonvolatile semiconductor memory devices have been increasing.

The controller may control data communication between the host and the memory device. For example, the controller may control the memory device in response to a request from the host. Also, the controller may perform a background operation without any request from the host so as to improve the performance of the memory system.

The host may communicate with the memory device through the controller by using an interface protocol such as Peripheral Component Interconnect-Express (PCI-E), Advanced Technology Attachment (ATA), Serial ATA (SATA), Parallel ATA (PATA), or Serial Attached SCSI (SAS). Interface protocols between the host and the memory system are not limited to the above-described examples, and may include various interfaces such as a Universal Serial Bus (USB), a Multi-Media Card (MMC), an Enhanced Small Disk Interface (ESDI), and Integrated Drive Electronics (IDE).

SUMMARY

Various embodiments of the disclosed technology relate to a controller capable of simplifying management of an allocation table and a memory system having the controller.

In accordance with an aspect of the disclosed technology, a first storage area configured to store mapping information between logical addresses of logical regions of a storage device coupled to the controller and physical addresses of memory blocks of the storage device, the logical regions being divided into logical units including a first logical unit; and a second storage area configured to store allocation information on logical addresses of logical regions allocated to the first logical unit, each of the logical regions allocated to the first logical unit having a corresponding index, and wherein the second storage area is further configured to store a location table including index information on a smallest index among indices corresponding to the logical regions allocated to the first logical unit and number information on a total number of the logical regions allocated to the first logical unit.

In accordance with another aspect of the disclosed technology, there is provided a memory system including: a memory device including memory blocks storing data; and a controller coupled to the memory device and configured to control the memory device using logical regions obtained by dividing a total capacity of the memory device into logical units, wherein the controller includes: a storage region configured to store mapping information between logical addresses of the logical regions and physical addresses of the memory blocks; an interface region configured to store allocation information on logical addresses of logical regions allocated to each logical unit, and further store index information on indices corresponding to logical regions at which corresponding logical units start and total number information on a total number of the logical regions allocated to each logical unit; and a processing region configured to control an allocation or release of at least one of the logical units in response to a request from a host coupled to the controller.

BRIEF DESCRIPTION OF THE DRAWINGS

Example embodiments will now be described hereinafter with reference to the accompanying drawings; however, they may be embodied in different forms and should not be construed as limited to the embodiments set forth herein.

FIGS. 2A to 2C are example diagrams illustrating a namespace allocated to a storage device.

DETAILED DESCRIPTION

In the present disclosure, advantages, features and methods for achieving them will become more apparent after a reading of the following exemplary embodiments taken in conjunction with the drawings. The present disclosure may, however, be embodied in different forms and should not be construed as being limited to the embodiments set forth herein.

Figure 1:
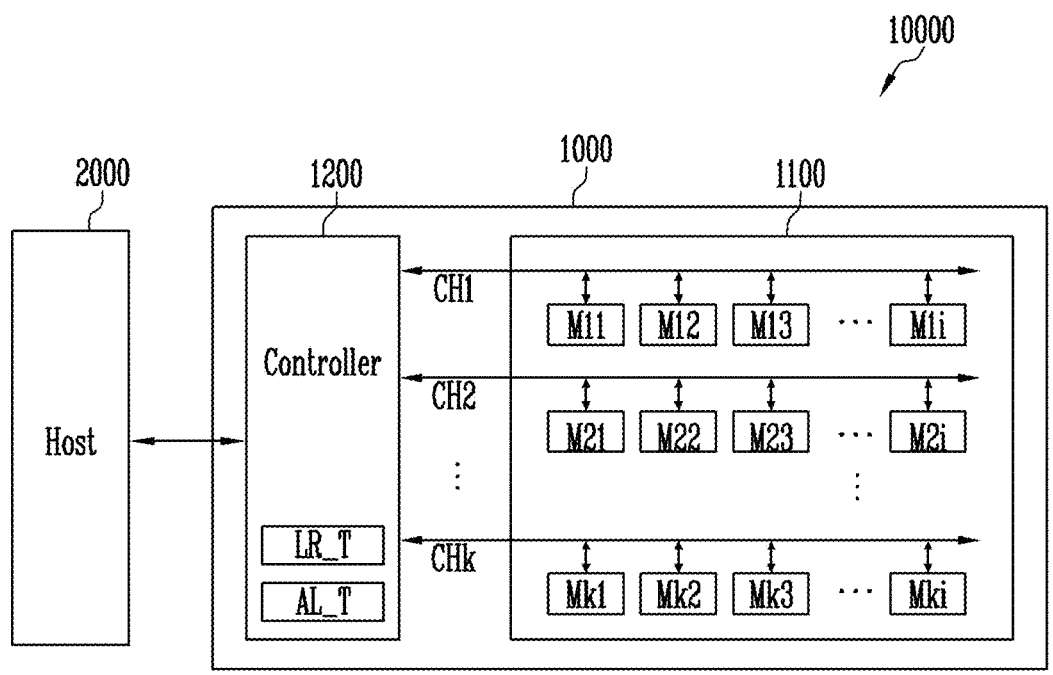
FIG. 1 is an example diagram illustrating a memory system in accordance with an embodiment of the disclosed technology.

FIG. 1 is a diagram illustrating a memory system in accordance with an embodiment of the disclosed technology.

Referring to FIG. 1, an electronic device 10000 may include a memory system 1000 and a host 2000.

The memory system 1000 may include a storage device 1100 configured to store data and a controller 1200 configured to communicate between the storage device 1100 and the host 2000.

The storage device 1100 may include a plurality of memory devices M11 to Mki (k and i are positive integers). For example, the memory devices M11 to Mki may be implemented with a volatile memory device in which stored data disappears when the supply of power is interrupted, or be implemented with a nonvolatile memory device in which stored data is retained even when the supply of power is interrupted. In the following embodiments, the memory devices M11 to Mki implemented with the nonvolatile memory device will be described as an example. For example, the nonvolatile memory device may be a NAND flash memory device.

The memory devices M11 to Mki may be coupled to the controller 1200 through a plurality of channels CH1 to CHk (k is a positive integer). For example, 11th to 1ith memory devices M11 to M1i may be coupled to a first channel CH1, 21th to 2ith memory devices M21 to M2i may be coupled to a second channel CH2, and k1th to kith memory devices Mk1 to Mki may be coupled to a kth channel CHk. First to ith memory devices M11 to Mki coupled to different channels CH1 to CHk are physically different devices, and hence physical addresses of the memory devices M11 to Mki are different from one another.

The controller 1200 may communicate between the host 2000 and the storage device 1100. For example, the controller 1200 may access the storage device 1100 in response to a request from the host 2000, or access the storage device 1100 to perform a background operation.

The controller 1200 in accordance with this embodiment may manage the plurality of memory devices M11 to Mki for each namespace unit that is a logical unit. For example, the memory devices M11 to Mki are devices physically distinguished from one another, and different physical addresses are allocated to each device. The controller 1200 may divide the memory devices M11 to Mki, which are physically distinguished from one another, into a plurality of logical regions based on a constant storage capacity, and manage the logical regions by using a namespace unit. For example, a plurality of logical regions may be included in one namespace. The namespace may be newly allocated or released in response to a request from the host 2000, and the controller 1200 may include a logical region table LR_T and an allocation table AL_T that are used to manage the namespace. The release of the namespace may make a memory corresponding to the namespace free and available.

Mapping information of a logical region and a physical address may be stored in the logical region table LR_T. Mapping information of a namespace and a logical region may be stored in the allocation table AL_T. A detailed method of managing a name space will be described later.

The host 2000 may generate requests for various operations, and output the generated requests to the memory system 1000. For example, the requests may include a program request capable of controlling a program operation, a read request capable of controlling a read operation, an erase request capable of controlling an erase operation, and others. The host 2000 may communicate with the memory system 1000 through various interfaces such as Peripheral Component Interconnect-Express (PCI-E), Advanced Technology Attachment (ATA), Serial ATA (SATA), Parallel ATA (PATA), Serial Attached SCSI (SAS), or Non-Volatile Memory Express (NVMe), a Universal Serial Bus (USB), a Multi-Media Card (MMC), an Enhanced Small Disk Interface (ESDI), or Integrated Drive Electronics (IDE).

Figure 2A:
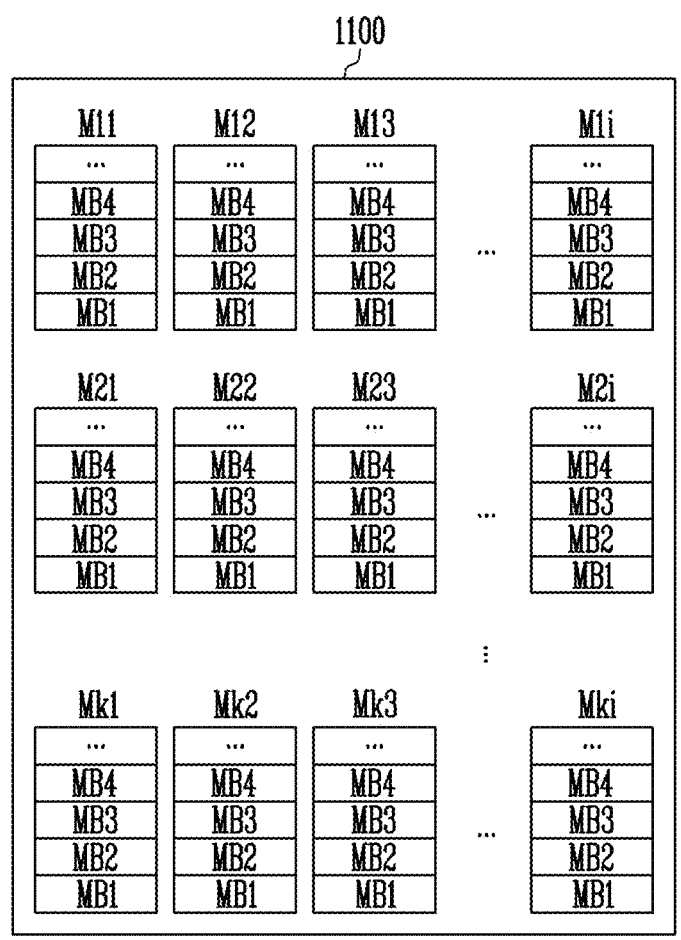

FIGS. 2A to 2C are example diagrams illustrating a namespace allocated to the storage device.

FIG. 2A is a diagram illustrating a physical structure of the storage device 1100, FIG. 2B is a diagram illustrating the storage device 1100 divided into a plurality of logical regions, and FIG. 2C is a diagram illustrating a namespace allocated to the storage device.

Referring to FIG. 2A, each of a plurality of memory devices M11 to Mki included in the storage device 1100 may include a plurality of memory blocks including memory blocks MB1, MB2, MB3, MB4. Although only the memory blocks including memory blocks MB1, MB2, MB3, MB4 are illustrated in FIG. 2A, the memory devices M11 to Mki can further include circuits configured to perform a program operation, a read operation, and an erase operation on the memory blocks including the memory blocks MB1, MB2, MB3, MB4.

The memory blocks may be configured to have a same structure as one another. Different physical addresses may be allocated to the respective memory blocks.

Referring to FIG. 2B, the total capacity of the storage device 1100 may be divided in logical regions. For example, when assuming that the total capacity of the storage device 1100 is 100 gigabytes (GB), the storage device 1100 may be divided into a plurality of logical regions 1R to 100R each having a storage capacity of 1 GB. The plurality of memory devices M11 to Mki or the memory blocks which are included in the storage device 1100, may be divided into a plurality of logical regions 1R to 100R each having a storage capacity of 1 GB. In this embodiment, a case where the storage capacity of one logical region is 1 GB is described. However, other implementations are also possible and the storage capacity of the logical region may be variously set depending on storage devices.

Referring to FIG. 2C, a plurality of namespaces NS1 to NS4 may be allocated to the storage device 1100. The namespace may correspond to a sector having a predetermined storage capacity that is obtained by dividing the storage device 1100. For example, when first to fourth namespaces NS1 to NS4 are allocated for the storage device 1100, each of the first to fourth namespaces NS1 to NS4 may include a plurality of logical regions corresponding to an allocated storage capacity. For example, when the first namespace NS1 having 10 GB is allocated, first to tenth logical regions (1R to 10R shown in FIG. 2B) may be allocated to the first namespace NS1. When the second namespace NS2 having 20 GB is allocated, eleventh to thirtieth logic regions (11R to 30R shown in FIG. 2B) may be allocated to the second namespace NS2.

The first to fourth namespaces NS1 to NS4 may be allocated to have the same storage capacity, or be allocated to have different storage capacities. In some implementations, only a partial storage capacity instead of the total storage capacity of the storage device 1100 may be allocated to the first to fourth namespaces NS1 to NS4.

The controller (1200 shown in FIG. 1) may manage mapping of addresses to the first to fourth namespaces NS1 to NS4.

Figures 3, 4:
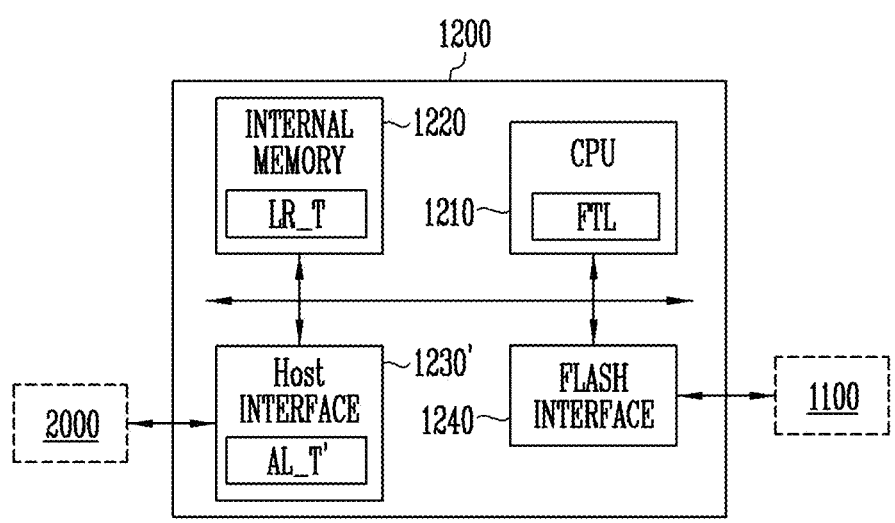
FIG. 3 is an example diagram illustrating a controller in accordance with an embodiment of the disclosed technology.
FIG. 4 is an example diagram illustrating a logic block address table.

FIG. 3 is a diagram illustrating a controller in accordance with an embodiment of the disclosed technology.

Referring to FIG. 3, the controller 1200 may include a Central Processing Unit (CPU) 1210, an internal memory 1220, a host interface 1230', and a flash interface 1240. The CPU 1210, the internal memory 1220, the host interface 1230' and the flash interface 1240 may exchange information with each other through an internal bus of the controller 1200.

The CPU 1210 may control overall operations of the controller 1200. The CPU 1210 may convert a request received from the host 2000 into a command that can be used in the storage device 1100, and output the command. In some implementations, the CPU 1210 may include a Flash Translation Layer (FTL) for managing mapping of an address. In this embodiment, the FTL may manage mapping between a namespace and a logical region, and manage mapping between a logical region and a physical address.

The internal memory 1220 may be configured as a volatile memory or a nonvolatile memory, and store map tables in which mapping information of logical and physical addresses used in the controller 1200 is stored. For example, the internal memory 1200 may be implemented as a DRAM, a flash memory, an SRAM, etc., and store a logical region table LR_T. Mapping information of a logical region and a physical address may be stored in the logical region table LR_T.

The host interface 1230' may transmit information between the host 2000 and the CPU 1210. The host interface 1230' may include a buffer memory, and an allocation table AL_T' in which mapping information of a namespace and a logical region is stored may be stored in the buffer memory. When an access to a namespace is requested from the host 2000, the host interface 1230' may select a namespace based on information stored in the allocation table AL_T'.

The flash interface 1240 may transmit information between the storage device 1100 and the CPU 1210. In some implementations, the flash interface 1240 may access a memory device stored in the storage device 1100 based on a physical address transmitted from the CPU 1210.

When an allocation request, change request or release request for a namespace is received from the host 2000, the FLT included in the CPU 1210 may change information stored in the logical region table LR_T and the allocation table AL_T'. In this embodiment, when a namespace is changed or released, the FTL may change the allocation table AL_T' without changing the logical region table LR_T. Since an operation of changing the logical region table LR_T is omitted when changing or releasing a namespace, the time required to perform an operation of managing the namespace can be reduced.

FIG. 4 is a diagram illustrating a logic block address table.

Referring to FIG. 4, a logical region table LR_T1 or LR_T2 may store mapping information between a logical region and a physical address, and the mapping information may be changed in various manners based on the storage capacity of the logical region.

When a storage capacity of one logical region corresponds to a storage capacity of a plurality of memory blocks, physical addresses of a plurality of memory devices may be mapped to each of logical regions of the logical region table LR_T1. For example, a physical address of eleventh and twelfth memory devices M11 and M12 may be mapped to a first logical region 1R, a physical address of thirteenth and fourteenth memory devices M13 and M14 may be mapped to a second logical region 2R, and a physical address of fifteenth and sixteenth memory devices M15 and M16 may be mapped to a third logical region 3R.

When a storage capacity of one logical region corresponds to a storage capacity of a plurality of memory blocks, which is smaller than that of one of a plurality of memory devices, physical addresses of a memory device and a plurality of memory blocks may be mapped to each of the logical regions of the logical region table LR_T2. For example, a physical address of the eleventh memory device M11 and a physical address of first to third memory blocks MB1 to MB3 may be mapped to a first logical region 1R, the physical address of the eleventh memory device M11 and a physical address of fourth to sixth memory blocks MB4 to MB6 may be mapped to a second logical region 2R, and a physical address of the twelfth memory device M12 and a physical address of the first to third memory blocks MB1 to MB3 may be mapped to a third logical region 3R.

The logical region tables LR_T1 and LR_T2 are shown in FIG. 4 as examples only and logical regions and physical addresses may be mapped in various manners without being limited to those as shown in FIG. 4.

Figure 5A:
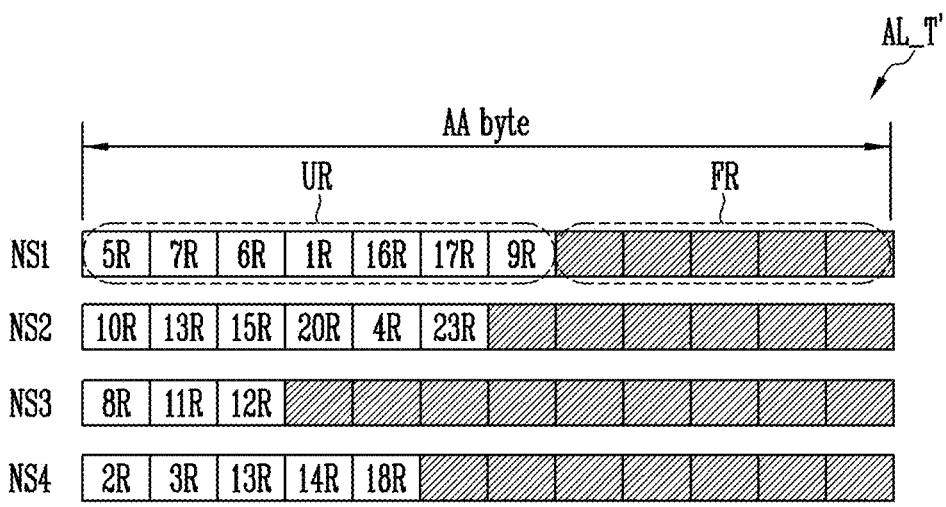
FIGS. 5A and 5B are example diagrams illustrating a management method of an allocation table in accordance with an embodiment of the disclosed technology.
Figure 5B:
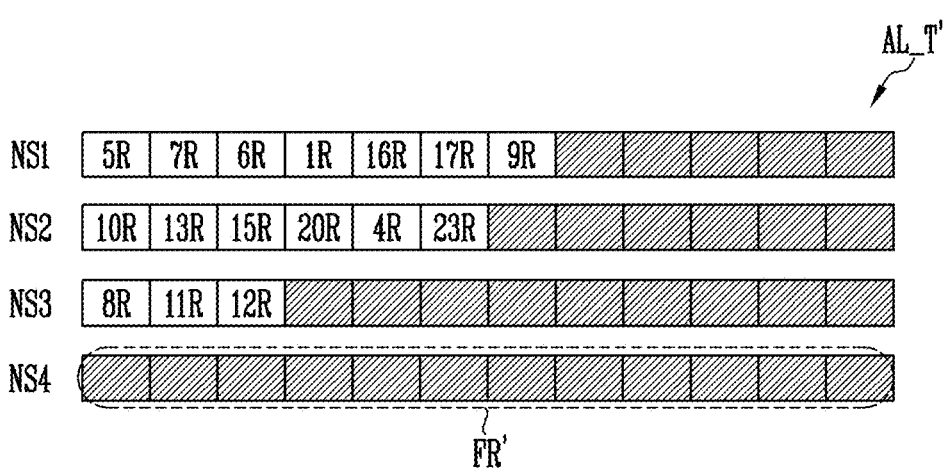

FIGS. 5A and 5B show example diagrams illustrating a management method of an allocation table based on an embodiment of the disclosed technology.

FIG. 5A shows a case that a number of namespaces is fixed and each name space has a fixed storage capacity. The allocation table AL_T' in FIG. 5 shows first to fourth namespaces NS1 to NS4, each having a corresponding storage region. The allocation table AL_T' can be stored in the buffer memory included in the host interface 1230' (see FIG. 3). Information of logical regions allocated to each namespace is stored in the allocation table. For example, when first to fourth namespaces NS1 to NS4 are allocatable for the memory device, a memory in which information of logical regions allocated to the first to fourth namespaces NS1 to NS4 can be stored may be included in a buffer memory in which the allocation table AL_T' is stored. For example, a memory of AA bytes may be designated to each of the first to fourth namespaces NS1 to NS4, and the designated memory may be fixed regardless of whether the namespace is generated and released. Thus, in this case, the memory of AA bytes may be always allocated to each of the first to fourth namespaces NS1 to NS4. Each name space can have at least one of a used region (UR) or a free region (FR). The used region UR stores addresses of logical regions that have been using for performing an operation. While a namespace is allocated, it is difficult for logical regions to be designated such that a storage capacity of the namespace is completely filled. Therefore, at least one of the namespaces has a free region FR corresponding to a storage capacity which has been not used and thus remaining available for the use. As an example, for the case of the first namespace NS1, when the used region is used for logical regions 5R, 7R, 6R, 1R, 16R, 17R, and 9R, addresses of logical regions corresponding to 5R, 7R, 6R, 1R, 16R, 17R, and 9R are stored in the memory of AA bytes. In this case, the free region FR may be remained as being unused and a corresponding storage region (e.g., memory blocks or memory devices) of the storage device is remained without being used. Therefore, until before all storage capacities fixedly allocated to the first to fourth namespaces NS1 to NS4 are used, a storage region corresponding to the unused free region FR may always remain in the buffer memory in which the allocation table AL_T' is stored.

FIG. 5B shows a case that when a namespace NS4 being used is released, a memory allocated to the released namespace remains in a state in which the memory is empty. Hence, the capacity of an unused free region FR' may be further increased.

Figure 6:
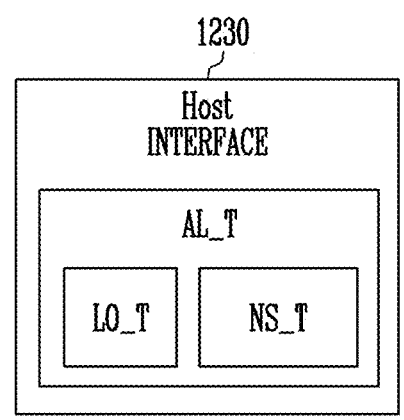
FIG. 6 is an example diagram illustrating a host interface in accordance with another embodiment of the disclosed technology.

FIG. 6 shows an example diagram illustrating a host interface in accordance with another embodiment of the disclosed technology. In the implementation as shown in FIG. 6, a memory allocated to the allocation table AL_T' decreases, and a memory in which addresses of logical regions allocated to namespaces are stored can be flexibly changed.

Referring to FIG. 6, the host interface 1230 in accordance with another embodiment of the disclosed technology may include an allocation table AL_T. The allocation table AL_T may include a location table LO_T and a namespace table NS_T. In some implementations, the location table LO_T and the namespace table NS_T may be stored in a buffer memory included in the host interface 1230. In some implementations, the location table LO_T and the namespace table NS_T may be stored in a buffer memory located outside of the host interface 1230.

The location table LO_T stores an index indicating a start location of each namespace stored in the namespace table NS_T and the number information of logical regions. Addresses of allocated logical regions may be stored for each namespace in the namespace table NS_T.

Figure 7:
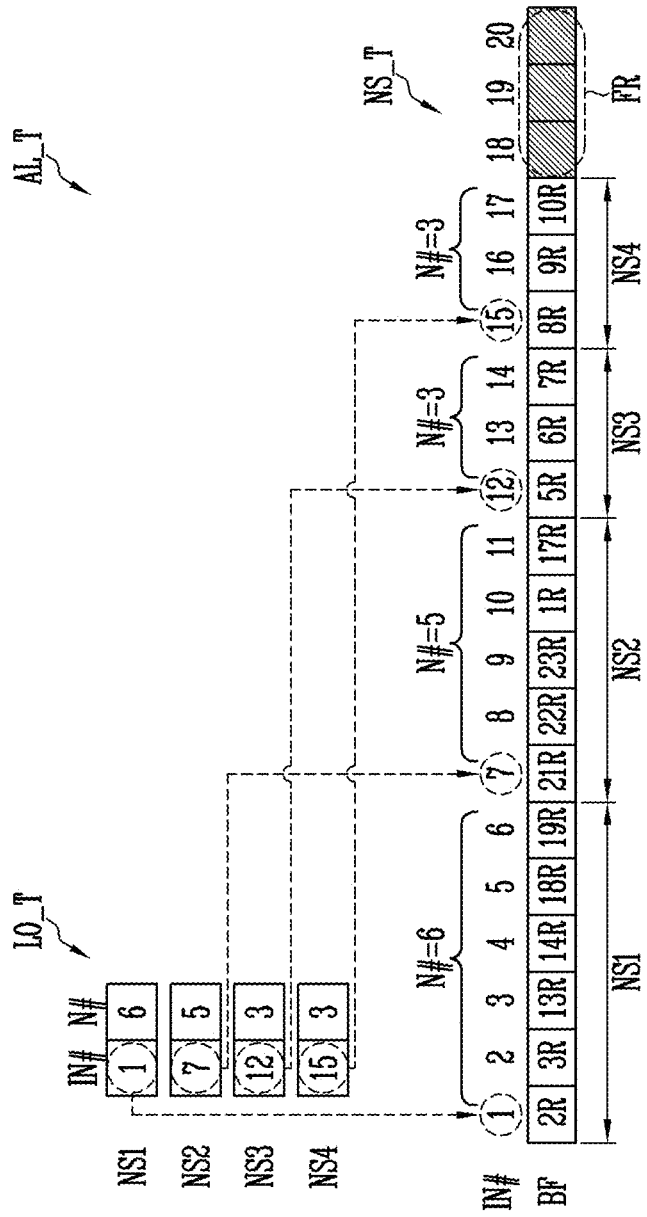
FIG. 7 is an example diagram illustrating a management method of an allocation table shown in FIG. 6.

FIG. 7 is a diagram illustrating a management method of the allocation table shown in FIG. 6.

Referring to FIG. 7, logical addresses of logical regions allocated to a namespace may be sequentially stored in the namespace table NS_T included in the allocation table AL_T. For example, a buffer memory BF in which the namespace table NS_T is stored may include a plurality of storage regions, and logical addresses of logical regions allocated to a namespace may be stored in the storage regions of the buffer memory BF. Indices IN # may be sequentially designated to a plurality of storage regions included in the buffer memory BF, and a fixed number of indices IN # may be set in the namespace table NS_T.

For example, six logical regions may be allocated to a first namespace NS1, five logical regions may be allocated to a second namespace NS2, and three logical regions may be allocated to each of third and fourth namespaces NS3 and NS4. In the buffer memory BF allocated to the namespace table NS_T, storage regions of which number corresponds to a number N # of logical regions allocated to each namespace may be used.

For example, logical addresses of six logical regions 2R, 3R, 13R, 14R, 18R, and 19R allocated to the first namespace NS1 may be respectively stored in storage regions corresponding to indices IN # 1 to 6, logical addresses of five logical regions 21R, 22R, 23R, 1R, and 17R allocated to the second name space NS2 may be respectively stored in storage regions corresponding to indices IN # 7 to 11, logical addresses of three logical regions 5R, 6R, and 7R allocated to the third namespace NS3 may be respectively stored in storage regions corresponding to indices IN # 12 to 14, and logical addresses of three logical regions 8R, 9R, and 10R allocated to the fourth namespace NS4 may be respectively stored in storage regions corresponding to indices IN # 15 to 17.

A first index IN # of each of the first to fourth namespaces NS1 to NS4 stored in the namespace table NS_T and number N # information of logical regions may be stored in the location table LO_T included in the allocation table AL_T. The first index IN # indicates the index number of the logical region at which each namespace starts and the number N # information indicates the total number of logical regions included in each namespace.

For example, since the logical addresses of the logical regions allocated to the first namespace NS1 are stored in storage regions corresponding to the indices 1 to 6 of the namespace table NS_T, 1 may be stored as index IN # information on the first namespace NS1 in the location table LO_T, and 6 may be stored as number N # information of logical regions in the location table LO_T. In this manner, 7 may be stored as index IN # information on the second namespace NS2 in the location table LO_T, and 5 may be stored as number N # information of logical regions in the location table LO_T. In the same manner, 12 may be stored as index IN # information on the third namespace NS3 in the location table LO_T, and 3 may be stored as number N # information of logical regions in the location table LO_T. 15 may be stored as index IN # information on the fourth namespace NS4 in the location table LO_T, and 3 may be stored as number N # information of logical regions in the location table LO_T.

As described above, only index IN # information in which a logical address of the logical region at which a corresponding namespace starts and the total number N # information of the logical regions included in the corresponding namespace are stored in the location table LO_T, and therefore, a storage capacity occupied by the location table LO_T is small.

In addition, the namespace table NS_T may be set by considering a number of logical regions allocated to a plurality of namespaces, and therefore, the capacity of an unused free region FR can be decreased.

A capacity occupied by the allocation table AL_T in the embodiment shown in FIG. 7 is smaller than that occupied by the allocation table AL_T' in the embodiment shown in FIG. 5, and the capacity of the unused free region FR can also be decreased. Thus, the capacity of the buffer memory for managing namespaces can be decreased.

Figure 8A:
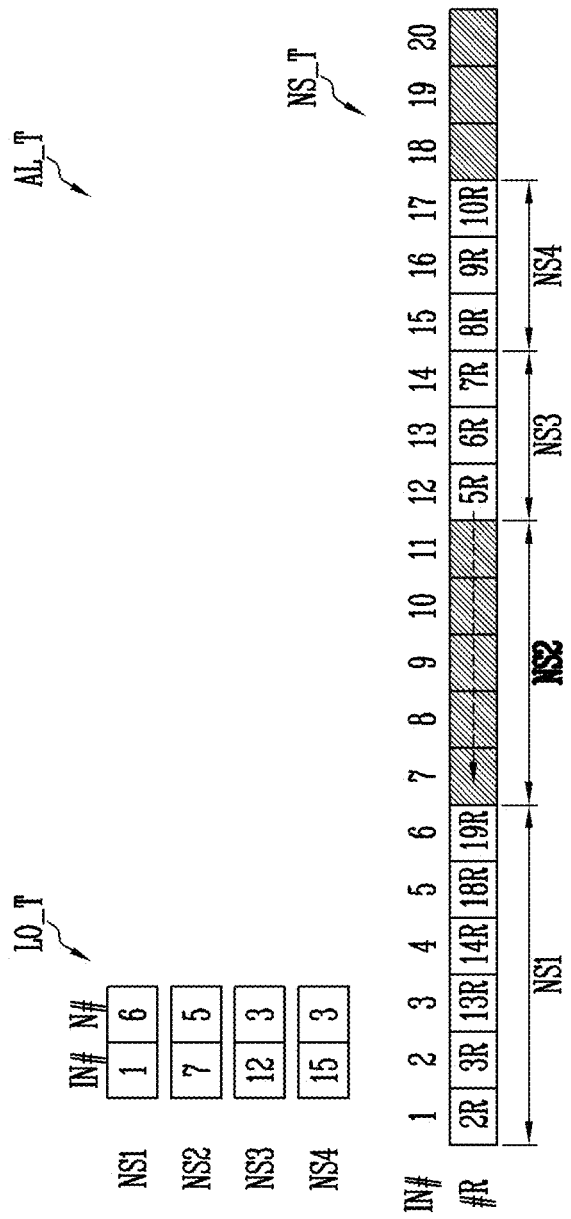
FIGS. 8A and 8B are example diagrams illustrating a method of releasing a namespace based on an implementation of the disclosed technology.
Figure 8B:
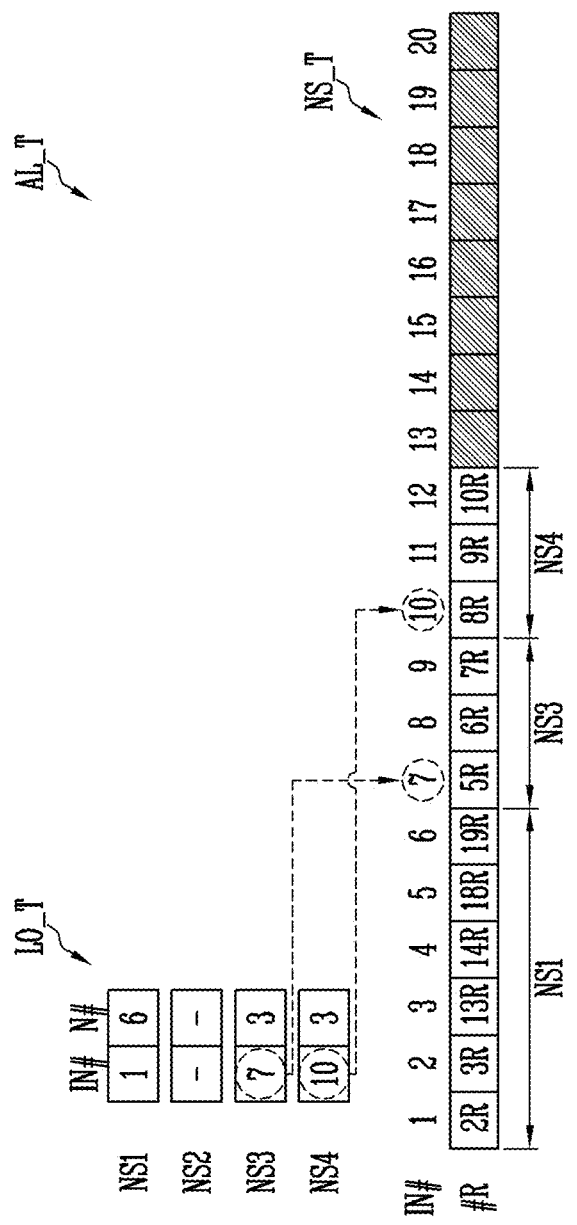

FIGS. 8A and 8B show example diagrams illustrating a method of releasing a namespace based on an implementation of the disclosed technology.

Referring to FIGS. 7 and 8A, when the second namespace NS2 is released in a state in which the first to fourth namespaces NS1 to NS4 are allocated as shown in FIG. 7, the logical addresses of the logical regions allocated to the second namespace NS2 may be deleted in the namespace table NS_T. Since the logical addresses of the logical regions allocated to the second namespace NS2 have been stored in storage regions corresponding to the indices 7 to 11, the corresponding storage regions may be reset.

When storage regions allocated to the second namespace NS2 are reset in the namespace table NS_T, logical addresses stored in storage regions of which index IN # numbers are higher those of the reset storage regions are moved to the reset storage regions as shown in FIG. 8B. For example, fifth the seventh logical regions 5R to 7R allocated to the third namespace NS3 may be moved from storage regions corresponding to indices 12 to 14 to storage regions corresponding to indices 7 to 9, and eighth to tenth logical regions 8R to 10R allocated to the fourth namespace NS4 may be moved from storage regions corresponding to indices 15 to 17 to storage regions corresponding to indices 10 to 12. Therefore, storage regions corresponding to indices 13 to 20 become a free region FR. Index IN # information and number N # information of logical regions, which correspond to the second namespace NS2, are erased in the location table LO_T.

As described above, when a namespace is released, only the location table LO_T and the namespace table NS_T are changed. Therefore, the logical region table (LR_T shown in FIG. 3) does not need to be immediately changed and can be updated in a background operation.

Figure 9A:
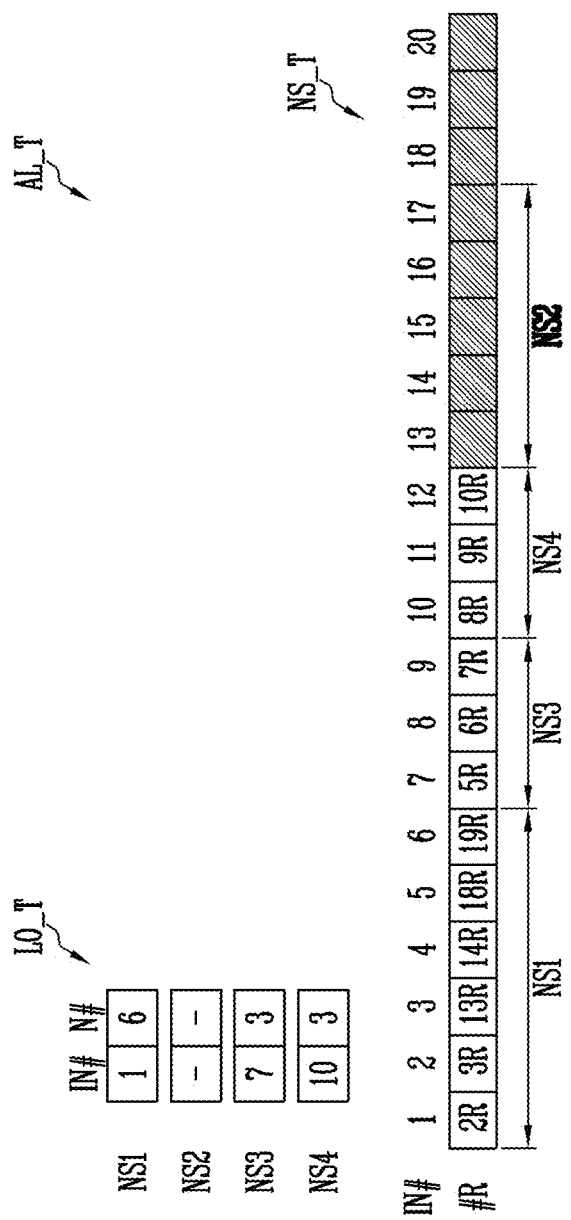
FIGS. 9A and 9B are example diagrams illustrating a method of allocating a namespace based on an implementation of the disclosed technology.
Figure 9B:
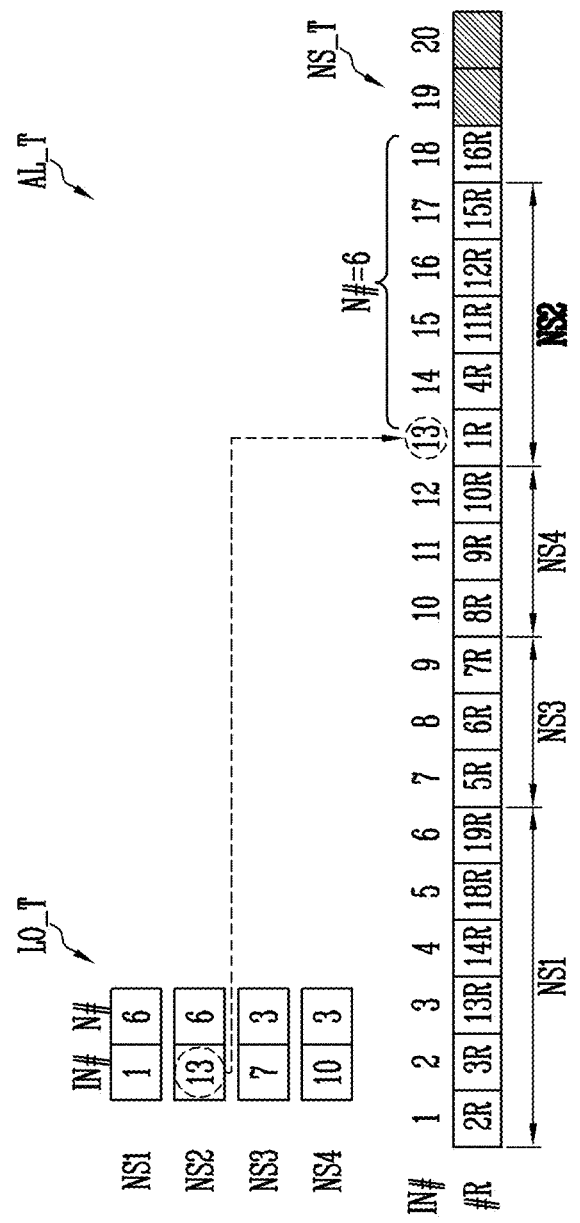

FIGS. 9A and 9B show example diagrams illustrating a method of allocating a namespace.

Referring to FIGS. 8A to 9B, when the second namespace NS2 to which first, fourth, eleventh, twelfth, fifteenth, and sixteenth logical regions 1R, 4R, 11R, 12R, 15R, and 16R are allocated is newly allocated, six logical regions are allocated to the second namespace NS2, and hence a logical address of the first, fourth, eleventh, twelfth, fifteenth, and sixteenth logical regions 1R, 4R, 11R, 12R, 15R, and 16R may be stored in storage regions corresponding to indices 13 to 18 in the free region FR. Therefore, 13 may be stored as index IN # information of the second namespace NS2 in the location table LO_T, and 6 may be stored as number N # information of logical regions in the location table LO_T.

Figure 10:
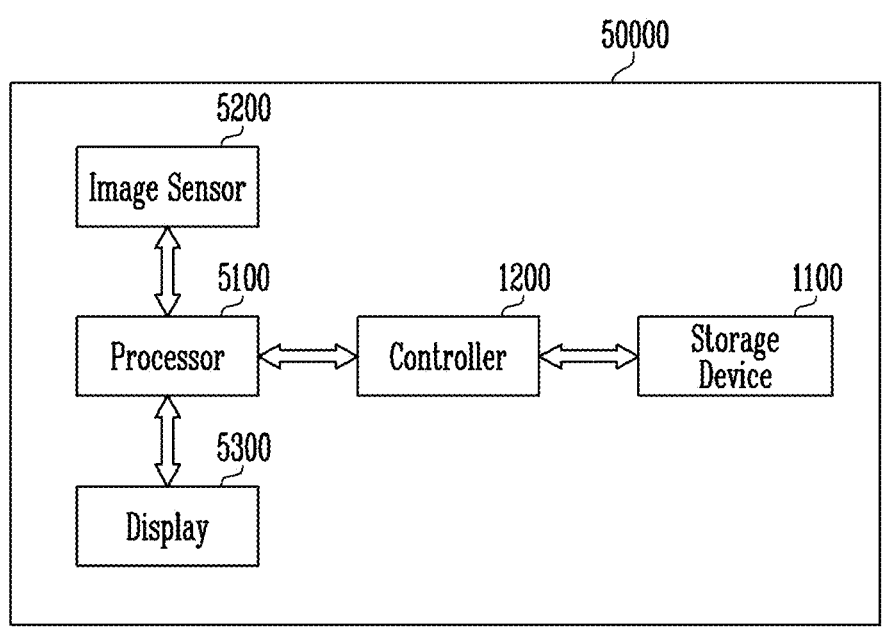
FIG. 10 is an example diagram illustrating another embodiment of the memory system including the controller shown in FIG. 1.

FIG. 10 is a diagram illustrating another embodiment of the memory system including the controller shown in FIG. 1.

Referring to FIG. 10, the memory system 50000 may be implemented as an image processing device, e.g., a digital camera, a smart phone having a digital camera attached thereto, or a tablet PC having a digital camera attached thereto.

The memory system 50000 may include a storage device 1100 and a controller 1200 capable of controlling a data processing operation of the storage device 1100, e.g., a program operation, an erase operation, or a read operation.

An image sensor 5200 of the memory system 50000 may convert an optical image into digital signals, and the converted digital signals may be transmitted to a processor 5100 or the controller 1200. Under the control of the processor 5100, the converted digital signals may be output through a display 5300, or be stored in the storage device 1100 through the controller 1200. In addition, data stored in the storage device 1100 may be output through the display 5300 under the control of the processor 5100 or the controller 1200.

In some embodiments, the controller 1200 capable of controlling an operation of the storage device 1100 may be implemented as a part of the processor 5100, or be implemented as a chip separate from the processor 5100.

Figure 11:
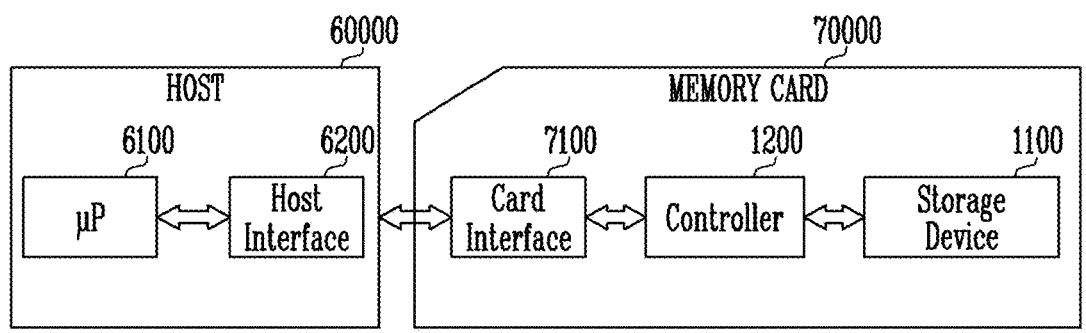
FIG. 11 is an example diagram illustrating another embodiment of the memory system including the controller shown in FIG. 1.

FIG. 11 is a diagram illustrating another embodiment of the memory system including the controller shown in FIG. 1.

Referring to FIG. 11, the memory system 70000 may be implemented as a memory card or a smart card. The memory system 70000 may include a storage device 1100, a controller 1200, and a card interface 7100.

The controller 1200 may control data exchange between the storage device 1100 and the card interface 7100. In some embodiments, the card interface 7100 may be a secure digital (SD) card interface or a multi-media card (MMC) interface, but the present disclosure is not limited thereto.

The card interface 7100 may interface data exchange between the host 60000 and the controller 1200 according to a protocol of the host 60000. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the storage device 1100 through the card interface 7100 and the controller 1200 under the control of a microprocessor (μP) 6100.

In addition, the microprocessor 6100 may store and update address mapping information received from the controller 1200, and output the address mapping information together with a read request in a read operation.

In accordance with the present disclosure, a memory capacity used for the allocation table can be decreased, and the allocation table mapping is simplified, so that the time required to perform the address mapping operation can be reduced.

Example embodiments have been disclosed herein, and it will be understood by those of skill in the art that various changes in form and details may be made without departing from the spirit and scope of the present disclosure.

What is claimed is:

1. A controller comprising:
a first storage area configured to store mapping information between logical addresses of logical regions of a storage device coupled to the controller and physical addresses of memory blocks of the storage device, the logical regions being divided into logical units including a first logical unit; and
a second storage area configured to store allocation information on logical addresses of logical regions allocated to the first logical unit, each of the logical regions allocated to the first logical unit having a corresponding index,
wherein the second storage area is further configured to store a location table for the first logical unit that includes index information having a smallest index corresponding to a logical region allocated to the first logical unit without having other indices corresponding to remaining logical regions allocated to the first logical unit and number information on a total number of the logical regions allocated to the first logical unit.

2. The controller of claim 1, wherein the storage device includes a plurality of memory devices,
wherein each of the plurality of memory devices includes a plurality of memory blocks,
wherein the physical addresses are addresses of the plurality of memory blocks.

3. The controller of claim 1, wherein the first logical unit has a corresponding storage area in which logical addresses of the logical regions allocated to the first logical unit are stored and the storage area has a free region in which any data is not stored.

4. The controller of claim 3, wherein the logical units include a second logical unit and logical addresses of logical regions allocated to the second logical unit are stored in the free region.

5. The controller of claim 1, wherein the controller is configured to communicate with a host through an interface region located in the controller.

6. The controller of claim 5, wherein, in response to a request from the host to release the first logical unit, the index information corresponding to the first logical unit is erased from the location table.

7. The controller of claim 6, wherein the logical units include a second logical unit to which logical regions are allocated before the release of the first logical unit and index information corresponding to the second logical unit is changed due to the release of the first logical unit.

8. The controller of claim 7, wherein, after the release of the first logical unit, the second logical unit has a same index information as one that the first logical unit had before the release.

9. The controller of claim 1, wherein the allocation information and the location table are stored in a host interface region configured to communicate with a host coupled to the controller.

10. The controller of claim 1, wherein the allocation information and the location table are stored outside a host interface region configured to communicate with a host coupled to the controller.

11. The controller of claim 1, further comprising:
a processing unit configured to control the first storage area and the second storage area.

12. The controller of claim 1, wherein the mapping information stored in the first storage area is maintained regardless of a change on the allocation information stored in the second storage area.

13. A memory system comprising:
a memory device including memory blocks storing data; and
a controller coupled to the memory device and configured to control the memory device using logical regions obtained by dividing a total capacity of the memory device into logical units,
wherein the controller includes:
a storage region configured to store mapping information between logical addresses of the logical regions and physical addresses of the memory blocks;
an interface region configured to store allocation information on logical addresses of logical regions allocated to each logical unit, and further store index information having smallest indices corresponding to logical regions at which corresponding logical units start without having other indices corresponding to remaining logical regions allocated to the corresponding logical units and total number information on a total number of the logical regions allocated to each logical unit; and
a processing region configured to control an allocation or release of at least one of the logical units in response to a request from a host coupled to the controller.

14. The memory system of claim 13, wherein, in response to the request from the host, the processing region is configured to maintain the mapping information and change the index information and the total number information.

15. The memory system of claim 13, wherein the interface region includes a buffer memory configured to store the index information and the total number information.

16. The memory system of claim 13, wherein the logical unit includes a first logical unit and a second logical unit and logical regions allocated to the first logical unit and the second logical unit are stored consecutively.

17. The memory system of claim 16, wherein in response to the request from the host to release the first logical unit, the index information corresponding to the first logical unit is erased from the storage region.

18. The memory system of claim 16, wherein index information corresponding to the second logical unit is changed due to the release of the first logical unit.

19. The memory system of claim 16, after the release of the first logical unit, the second logical unit has a same index information as one that the first logical unit had before the release.

* * * * *